3,631,203
PREPARATION OF MONO-ESTERS OF HYDROQUINONES

Donald A. Bolon, Scotia, N.Y., assignor to General Electric Company
No Drawing. Filed Jan. 19, 1970, Ser. No. 4,114
Int. Cl. C07c 69/16, 69/28, 69/78
U.S. Cl. 260—476 R ..... 10 Claims

ABSTRACT OF THE DISCLOSURE

Mono-esters of hydroquinones are prepared from the 4-halophenol corresponding to the desired hydroquinone by oxidatively removing the halogen with selected oxidizing agents in the presence of the carboxylic acid whose monoester of the hydroquinone is desired. The products are useful as anti-oxidants, polymerization inhibitors, precursors of photographic developers, etc.

PREPARATION OF MONO-ESTERS OF HYROQUINONES

This invention relates to a method of making mono-esters of hydroquinones. More specifically, this invention relates to a method for producing mono-esters of 2,6-disubstituted hydroquinones, from the corresponding 4-halo-2,6-disubstituted-phenol by oxidative removal of the halogen group, using selected oxidizing agents, in the presence of the carboxylic acid whose mono-ester of the hydroquinone is desired. Under these conditions, the halogen atom on the phenol is replaced with the acyloxy radical of the carboxylic acid.

The esterification of hydroquinone or its ring substituted derivatives with alkanoic acids or their acyl halides always leads to the production of the di-ester, even though the hydroquinone is used in excess and the reaction is performed under conditions which should have produced the mono-ester. Apparently, the remaining hydroxyl group of the mono-ester is so highly activated by the formation of the first ester group that it is esterified in preference to either of the two hydroxyl groups of the hydroquinone. Attempts to react the di-ester with additional amount of the hydroquinone under trans-esterification conditions likewise fails to produce any of the mono-ester. However, it is possible to produce the mono-benzoate of hydroquinone and also mono-alkanoic esters of resorcinol.

The use of mono-esters of hydroquinone as precursors of photographic developers and photographic elements for the inversion-transfer type production of positive images is described in Belgian Patent 630,117. The difficulty in preparing the desired mono-esters is illustrated by the fact that in this patent they are prepared by first forming the monobenzyl ether which is then esterified with the acylhalide of the desired alkanoic acid. The ether-ester is hydrogenated under pressure at an elevated temperature to cleave the benzyl ether group but not the ester group, thereby producing the desired mono-ester. It is obvious that this process of producing mono-esters is not only cumbersome and time consuming but also very expensive.

I have now discovered that 2,6-disubstituted 4-halo-phenols having the formula,

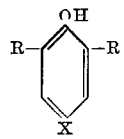

where each R is independently selected from the group consisting of lower alkyl and phenyl and X is a halogen having an atomic number of at least 17 can be converted to the mono-ester of the corresponding hydroquinone by replacing the halogen in the 4-position with the desired carbonyloxy or ester group. This replacement reaction is effected by an oxidizing agent in the presence of the carboxylic acid whose carbonyloxy moiety is to replace the halogen. When the carboxylic acid is a liquid, generally the reaction is carried out using it as the solvent for the reaction.

The oxidizing agents I have found satisfactory are manganese dioxide, lead dioxide, nickel peroxide, silver oxide, silver acetate and potassium permanganate.

The reaction proceeds very readily at room temperature but can be hastened by heating, if desired. Side reactions, which are favored by heating, produce some of the corresponding quinone and some polymer from the oxidative coupling of the phenol. To insure maximum yield of the desired mono-ester, at least one mole of the acid should be used per mole of the halophenol. Since the lower alkanoic acids are all liquids at room temperature, they can be used, not only as a reactant but as a solvent medium for the reaction. In the case of benzoic acid, which is a solid, an inert solvent for the phenol and the benzoic acid must be used. The particular solvent used is not critical and its choice is based generally on cost, availability and convenience. Typical of the solvents I can use are ether, dimethyl formamide, dimethylacetamide, dimethyl sulfoxide, etc.

At room temperature, the reaction is usually over in one hour, but may be allowed to proceed for a longer time, for example, overnight, without any deleterious effect. Where a metal oxide has been used, the reaction mixture is filtered. The filtrate, or the reaction mixture, in case a soluble oxidizing agent was used, is poured into water which is then extracted with ether or with other suitable solvent and the organic layer washed with sodium bicarbonate solution to remove any of the acid which may have been extracted. The desired mono-ester is then isolated from the organic layer by conventional techniques.

Typical of examples of the 2,6-disubstituted-4-halo-phenols which I may use are those having the previously mentioned formula wherein X is a halogen having an atomic number of at least 17, i.e., chlorine, bromine or iodine, but preferably chlorine or bromine and R is phenyl or lower alkyl, i.e., methyl, ethyl, propyl, isopropyl, the various butyl isomers, the various pentyl isomers, the various hexyl isomers, including cyclohexyl, the various heptyl isomers and the various octyl isomers.

The various carboxylic acids which can be used to form the mono-esters are benzoic acid and the lower alkanoic acids having at least two carbon atoms wherein a carboxyl group is attached to any of the various lower alkyl groups enumerated above. Specific examples of the alkanoic acids having two carbon atoms are acetic acid, propionic acid, n-butyric acid, isobutyric acid, n-valeric acid, trimethylacetic acid, caproic acid, n-heptylic acid, caprylic acid, pelargonic acid, etc.

In order that those skilled in the art may readily understand my invention, the following examles are given by way of illustration and not by way of limitation. In all of the examples, parts and percentages are by weight, temperatures are in degrees centigrade, and where analitical data is given, the determined values are followed by the calculated values in parentheses.

EXAMPLE 1

Potassium permanganate (1.58 g.) was added slowly to a solution of 2.34 g. of 4-chloro-2,6-xylenol in 125 ml. of glacial acetic acid, causing the solution to turn bright yellow. After the addition was complete and the potassium permanganate had all dissolved and reacted as evidence by the disappearance of its red color, the solution was poured into 500 ml. of water. The solution was extracted with the ether and the ether layer washed with sodium bicarbonate solution followed by water and then dried over anhydrous magnesium sulfate. After filtering the ether solution from the drying agent, the solvent was evaporated leaving a yellow gum. This product was silylated with bis-(trimethylsilyl) acetamide by the procedure described by J. F. Klebe, H. Finkbeiner and D. M. White in Journal of American Chemical Society 88, 3390 (1966), to stabilize the product from re-arrangement during heating. The silylated product was separated into its components by vapor phase chromatography, using a 2 foot silicone rubber column and programming from 100°–300° at 10°/min. The majority of the material came off at 7.2 minutes which was identified by its infrared and mass spectra as the trimethylsilyl ether of 4-acetoxy-2,6-dimethylphenol. This ether was hydrolyzed in methanol containing a slight amount of hydrochloric aicd as described by Klebe et al. in the above reference to produce the free phenol, 4-acetoxy-2,6-dimethylphenol, which is the mono-acetate ester of 2,6-di-methylhydroquinone.

EXAMPLE 2

Silver oxide (6.06 g.) was added to a mixture of 4.68 g. of 4-chloro-2,6-xylenol, 3.66 g. benzoic acid, 5 g. anhydrous magnesium sulfate and 100 ml. of dimethylformamide. The mixture was stirred for 18 hours at room temperature and filtered into water. The organic materials were extracted into ether and the ether layer washed with water, sodium bicarbonate, again with water and then dried over anhydrous magnesium sulfate. After removal of the solvent, a red gum remained which was dissolved in hexane and cooled to produce two crops of tan crystals weighing 0.8 g. Recrystallization from hot hexane gave pale yellow crystals having a melting point of 139°–141° which were identified as 4-benzoyloxy-2,6-dimethylphenol, the mono-benzoate ester of 2,6-dimethylhydroquinone, which analyzed: C, 74.5 (74.4); H, 5.7 (5.8); M.W., 245 (242).

EXAMPLE 3

A solution of 0.65 g. of 4-bromo-2,6-diphenylphenol in 30 ml. of propionic acid was stirred with 0.46 g. of silver oxide for 2 hours at room temperature. After this time the reaction mixture was poured into water and the organic material extracted with ether. The excess acid was washed from the ether with sodium bicarbonate solution and the phenols in the ether were then converted to their trimethylsilyl ethers as described in Example 1.

A vapor phase chromatograph showed that the product consisted of the trimethylsilyl ethers of two phenols. One was present to the extent of 80% and was identified as the trimethylsilyl ether of 4-bromo-2,6-diphenylphenol. The other was present to the extent of 20% and was collected and identified by its infrared spectrum and confirmed by its mass spectrum to be the trimethylsilyl ether of 4-propionoxy-2,6-diphenylphenol. Hydrolysis of this product as described in Example 1 produces 2,6-diphenyl-4-propionoxyphenol, the monopropionate ester of 2,6-diphenylhydroquinone.

EXAMPLE 4

A solution of 0.57 g. of 4-bromo-2,6-di-t-butylphenol in 30 ml. glacial acetic acid and 0.57 g. of silver oxide were stirred for 8 hours at room temperature. The reaction mixture was poured into water and the organics extracted with ether. The ether layer was separated, washed with water and dilute sodium bicarbonate. It was dried over magnesium sulfate and analyzed by vapor phase chromatography.

The analysis showed the existence of two phenols. Because of the hindered nature of the phenolic OH, it was not necessary to convert these compounds to their trimethylsilyl ethers before chromatography. They were identified by their mass spectra as 75% recovered 4-bromo-2,6-di-t-butylphenol and 25% 4-acetoxy-2,6-di-t-butylphenol, the monoacetate ester of 2,6-di-t-butylhydroquinone.

The mono-esters of this invention, as mentioned above, are useful as anti-oxidants, as polymerization inhibitors for polymerizable monomers or can be incorporated in photographic developer compositions. Likewise, if desired, the mono-esters of the hydroquinones may be hydrolyzed to produce the corresponding free hydroquinones which are useful as reducing agents in photographic compositions or can be reacted with phosgene, bis-haloformates or diacyl halides to produce polycarbonate and polyester resins useful as molding and coating compositions.

Obviously, other modifications and variations of the present invention are possible in light of the above teachings. It is, therefore, to be understood that changes may be made in the particular embodiments of the invention described which are within the full and intended scope of the invention as defined by the appended claims.

What I claim as new and desire to secure by Letters Patent of the United States is:

1. The process of producing a mono-ester of a hydroquinone which comprises oxidizing a 2,6-disubstituted 4-halophenol having the formula,

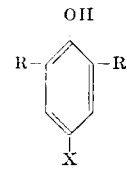

where each R is independently selected from the group consisting of lower alkyl and phenyl and X is halogen having an atomic number of at least 17, in the presence of a carboxylic acid selected from the group consisting of lower alkanoic acids having at least two carbon atoms and benzoic acid using an oxidizing agent selected from the group consisting of manganese dioxide, lead dioxide, nickel peroxide, silver oxide, silver acetate and potassium permanganate.

2. The process of claim 1 wherein the phenol is a 2,6-disubstituted-4-chlorophenol.

3. The process of claim 1 wherein the phenol is a 2,6-di-(lower alkyl)-4-chlorophenol.

4. The process of claim 1 wherein the phenol is a 2,6-disubstituted-4-bromophenol.

5. The process of claim 1 wherein the phenol is a 2,6-di-(lower alkyl)-4-bromophenol.

6. The process of claim 1 wherein the phenol is 4-chloro-2,6-xylenol.

7. The process of claim 1 wherein the phenol is 4-bromo-2,6-diphenylphenol.

8. The process of claim 1 wherein the carboxylic is acetic acid.

9. The process of claim 1 wherein the carboxylic acid is propionic acid.

10. The process of claim 1 wherein the carboxylic acid is benzoic acid.

References Cited

FOREIGN PATENTS

| 671,562 | 10/1963 | Canada | 260—476 |
| 630,117 | 3/1962 | Belgium | 260—476 |

JAMES A. PATTEN, Primary Examiner

J. L. DAVISON, Assistant Examiner

U.S. Cl. X.R.

96—88; 252—404; 260—61, 410.5, 476 C, 479 R, 625